May 4, 1937.  J. H. MARKLEY  2,079,417
ROCK DRILL HOOD
Filed July 13, 1933
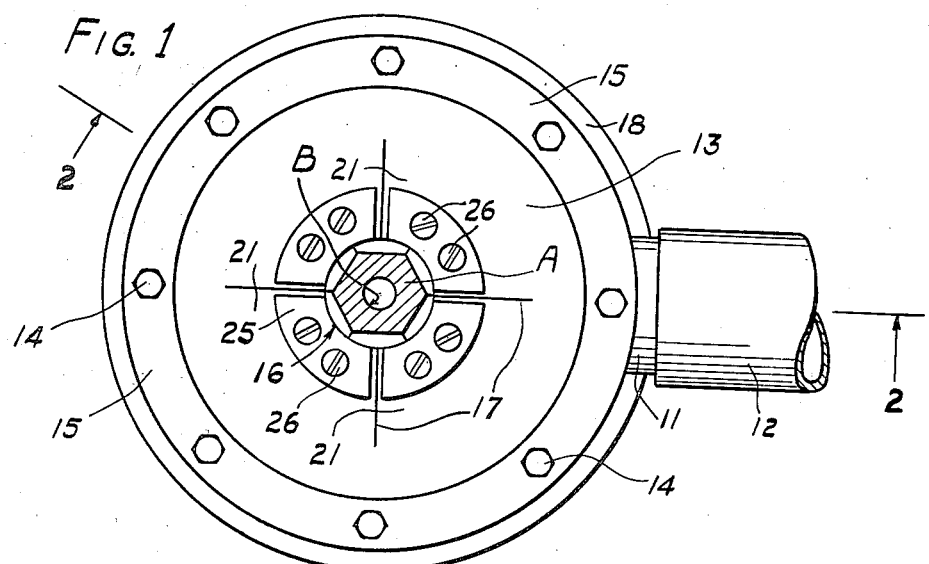
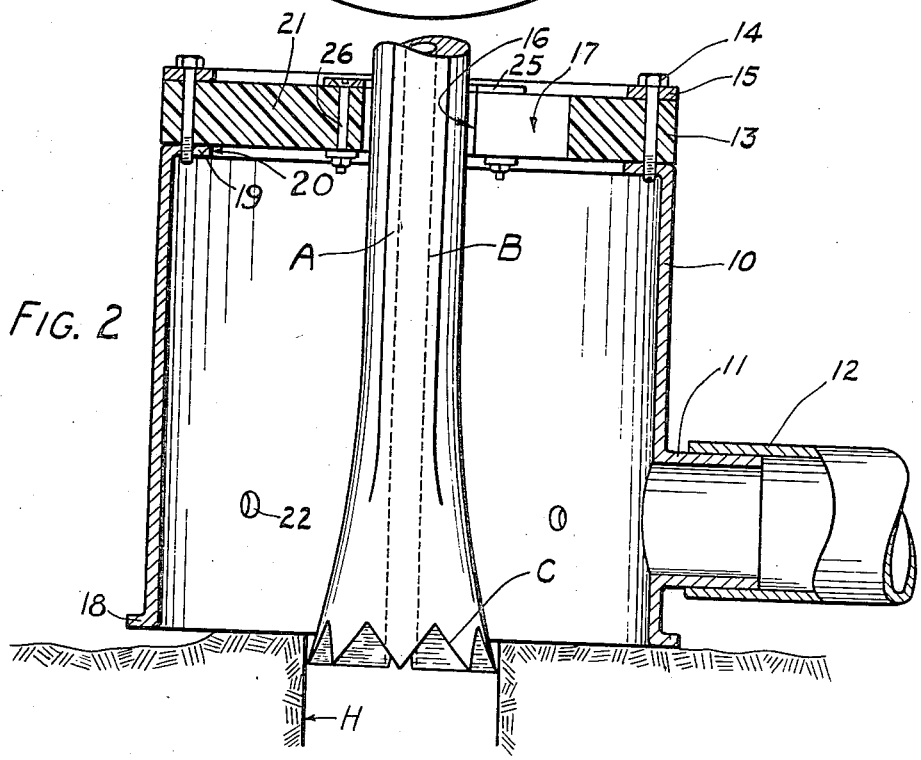
INVENTOR
JAMES H. MARKLEY
BY
Bohleber & Ledbetter
ATTORNEYS Patented May 4, 1937

2,079,417

UNITED STATES PATENT OFFICE 2,079,417

ROCK DRILL HOOD

James H. Markley, Ramsey, N. J.

Application July 13, 1933, Serial No. 680,224

2 Claims. (Cl. 255—50)

The invention relates to a rock drill hood which is adapted to surround the stem of a drill steel and form a cover or hood over the opening being drilled. A rock drill comprises a driving motor and cutting tool termed a drill steel. The cutting head or bit of the drill steel is carried upon the stem of the drill steel and the shank at the other end fits in the motor. The hood is connected with a suction mechanism which draws the dust and chips created during the drilling of the hole out of the hood and filters it out of the air sucked from the hood so that little or a substantially reduced proportion of the dust is scattered into the surrounding air.

It is an object of the invention to construct a new and novel hood which will readily pass the large diameter head or bit of the drill steel in both directions through the top thereof and will provide no openings therein which permit the escape of any or a material amount of dust therethrough.

Another object of the invention is to construct a rock drill hood which is simply constructed and does not require any opening of the hood in order to pass the large diameter bit of the drill steel therethrough prior to beginning the drilling of the hole and when one drill steel is to be removed and substituted by another having a greater length.

Other objects of the invention will be more apparent from the following description taken in connection with the accompanying drawing, in which:

Figure 1 is a top view of the rock drill hood showing the stem of the drill steel passing through the top thereof.

Figure 2 is a cross section through the rock drill hood showing a drill steel in position with the large diameter bit thereof in the hole being drilled.

Rock drill hoods are known which prevent the escape of dust and cuttings into the surrounding air to a substantial extent, but which are inconvenient to use. One such rock drill hood is split centrally and in order to remove one steel drill and insert another, the hood must be opened up for each change of the drill steel. Usually drill steels are provided in varying lengths and gauges and every time the hole has been extended two feet with one drill steel, a new drill steel must be substituted having a greater length. For every such change of drill steels, it is necessary to open up the hood and remove the shorter drill steel therefrom and then close the hood upon the longer drill steel which will be used to continue the drilling of the hole. With the construction of rock drill hood described herein, this inconvenience is overcome without sacrificing in the slightest the ability of the hood to prevent the escape of stone dust and cuttings from the hole. In fact, the hood to be described herein affords a tighter seal against the escape of dust and cuttings. The hood also satisfactorily seals the hole being drilled against the escape of dust and cuttings even though the drill is tilted at a substantial angle with respect to the axis of the hood, as will appear more fully hereinafter.

The rock drill hood comprises a casing 10 which has a tubular connection or extension 11 in the side thereof. The casing 10 is shown as being circular, although any other form is satisfactory. The tubular connection 11 is connected with a rubber tube 12 which is in turn connected with a suction or vacuum creating device or fan. The suction creating device usually takes the form of a fan with bags or other receptacles which catches the rock drill dust and cuttings from the air which carries it to the device. The suction creating mechanism and the dust catching devices do not constitute a part of the invention and hence are not shown or described.

The casing 10 may have a flange 18 at the bottom thereof merely for the purpose of providing a better base for the hood. The top of the casing 10 has an inwardly directed flange 19 which provides an opening 20 at the top thereof. The opening 20 at the top of the casing 10 is covered with a member 13. The member has flexible inwardly directed projections 21 which extend toward each other and form an opening 16 therethrough. The opening 16 is a little larger than the diameter of the stem of the drill steel A so that air flows therethrough around the drill, into the hood and through the connection 12 to the suction device so that dust and cuttings will not escape therethrough. The opening also provides clearance for the drill steel stem. The side of the casing 10 may also have one or more small holes 22 in the side of the wall which provide a point of inlet for air into the hood, the air serving as a carrier for the dust and cuttings.

In the preferred construction the member 13 comprises a flexible member of substantial thickness which is secured over the opening 20 in the casing 10 by means of a ring 15 and the bolts 14 passing through the ring 15, the flexible member 13 and the flange 19 of the casing 10. The flexible member 13 is clamped between the ring 15 and the flange 19. The flexible member 13 has a central hole 16 therethrough which is slightly larger than the stem of the drill steel A. A plurality of radial slits 17 provide flexible projections 21.

The flexible member 13 may be of leather, various rubber compositions, felt and other materials. It has been found, however, that a rubber gasket in sheet form has been most satisfactory from the standpoint of providing the required degree of resiliency and also providing the maximum resistance against wear in the sides of the opening 16 from contact with the drill steel stem. The rubber so far found which is best suited for the gasket is a rubber having a tensile strength of about 2200 pounds, contains 80 per cent of pure rubber, and has a specific gravity of 1.65. Any flexible gasket or gasket material is suitable, but the rubber gasket has been found more satisfactory from the standpoint of resiliency, wear and sealing of the slit between adjacent projections.

The radial slits which divide the member 13 into inwardly directed projections 21 are preferably slits and not slots. A slot has some relative width, whereas a slit may be cut with a knife and no material is removed. The adjacent faces of the projections separated by a slit contact with each other and seal themselves without affecting the flexibility of the projections 21, whereas if they were slots, some means should be provided in order to effectively seal the slots against the escape of rock dust and cuttings therethrough after the drill bit has passed through the gasket 13.

The gasket 13 preferably has wear plates 25 secured adjacent the edge of the opening 16 and upon each flexible projection 21. The wear plates are secured in place by means of bolts 26 which pass through the projection upon which the wear plate is mounted. The bit of the drill steel is placed upon the wear plates 25 when it is inserted into the hood and thereby prevents the relatively soft gasket from being cut and worn by the cutting teeth of the bit. The wear plates are also adjacent or at the edge of the opening 16 and consequently assist in protecting the rubber gasket against wear caused by the rotating drill stem contacting with the side of the opening.

The rock drill hood described herein is used in a manner now to be described. The hood is placed over the hole H to be drilled. The cutting teeth C or the bit of the drill steel A are considerably larger in diameter than the stem of the drill steel. The drill steel is placed centrally upon the member 13 and pushed downwardly. The flexible projections 21 yield and permit the large diameter bit C of the drill to pass therethrough and thereafter the flexible projections 21 return to their initial position and fit around the drill steel stem. Drilling may continue so long as the drill steel is capable of extending the hole, whereupon the drill steel is pulled upwardly and the flexible projections 21 give upwardly to pass the large diameter bit C of the drill steel therethrough for substitution of a longer drill steel. It will be observed that this operation of changing drill steels, so far as the bit is concerned, offers no difficulty or any additional operation in order to pass the bit into the hood and the drilled hole. Even though the bit may be passed into the hood in this manner, the hood nevertheless provides an effective means for catching dust and cuttings from the drilled hole with a minimum of escape thereof.

The rock drill hood described above need not be sealed at the bottom or at the flange 18. In drilling a hole through rock, high pressure air is periodically directed down the hole B through the drill steel which blows the dust and cuttings upwardly around the cutters C and stem into the hood A. This high pressure flow of air blows the dust and cuttings upwardly through the hole H into the top of the casing 10 and some of it against the member 13 so that any unnecessary openings therein provide places for the escape of some dust and cuttings which may be blown therethrough in spite of the suction created by the suction device. It is important, therefore, that the member 13 be tight in the slits 17 between the flexible projections 21. The suction in the casing 10 from the suction creating device connected to the connections 11 and 12 creates a suction which prevents the escape of dust and cuttings under the bottom of the flange 18 and the suction of air around the drill steel stem at the opening 16 prevents any or any material escape of dust and cuttings at this point. Some heavier particles of rock may possibly accumulate at the bottom of the hood, but these heavier particles do not create the dust and fine cuttings which are so injurious to the health of the workmen.

With the rock drill hood described herein, having the flexible projections 21, it is not essential that the drill steel A pass vertically through the projections 21. In fact, it has been found that the drill steel may be inclined at an angle of 45° with respect to the axis of the casing 10 and the flexible projections 21 provide a highly efficient and tight seal against the escape of dust and cuttings therethrough.

Various modifications will occur to those skilled in the art in the configuration, composition and disposition of the component elements going to make up the invention as a whole, as well as in the selective combination or application of the respective elements, and no limitation is intended by the phraseology of the foregoing description or illustrations in the accompanying drawing, except as indicated in the appended claims.

What is claimed is:

1. A rock drill hood comprising a casing having an open top, a member secured to the casing and covering the open top, flexible projections carried by the member and extending radially inward towards each other, the projections forming an opening centrally therethrough to receive the stem of a rock drill steel, the flexible projections being long enough to permit the large bit of the drill steel to pass therethrough and thereafter sealing the adjacent projections against the escape of rock dust and cuttings therebetween, and wear plates secured to the flexible projections adjacent to the central opening.

2. A rock drill hood comprising a casing having an open top, a member secured to the casing and covering the open top, flexible projections carried by the member and extending radially inward towards each other, the projections forming an opening centrally therethrough to receive the stem of a rock drill steel, the flexible projections being long enough to permit the large bit of the drill steel to pass therethrough and thereafter sealing the adjacent projections against the escape of rock dust and cuttings therebetween, and wear plates secured to the upper face of the flexible projections and at the edge of the central opening to protect the gasket against the drill bit and to protect the central opening against wear.

JAMES H. MARKLEY.